(12) United States Patent
Köster

(10) Patent No.: US 12,060,121 B2
(45) Date of Patent: Aug. 13, 2024

(54) KINGPIN ARRANGEMENT

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 673 days.

(21) Appl. No.: 17/271,440

(22) PCT Filed: Jun. 4, 2020

(86) PCT No.: PCT/EP2020/065473
§ 371 (c)(1),
(2) Date: Feb. 25, 2021

(87) PCT Pub. No.: WO2020/249458
PCT Pub. Date: Dec. 17, 2020

(65) Prior Publication Data
US 2021/0188375 A1    Jun. 24, 2021

(30) Foreign Application Priority Data
Jun. 13, 2019    (DE) ..................... 10 2019 116 064.2

(51) Int. Cl.
*B62D 53/12*    (2006.01)
*B62D 53/08*    (2006.01)

(52) U.S. Cl.
CPC ....... *B62D 53/125* (2013.01); *B62D 53/0842* (2013.01)

(58) Field of Classification Search
CPC ..................... B62D 53/125; B62D 53/0842
See application file for complete search history.

(56) References Cited

U.S. PATENT DOCUMENTS

| | | | |
|---|---|---|---|
| 5,066,035 A | 11/1991 | Athans et al. | |
| 11,530,006 B2* | 12/2022 | Köster | B60D 1/015 |
| 11,548,574 B2* | 1/2023 | Köster | B62D 53/125 |

(Continued)

FOREIGN PATENT DOCUMENTS

| | | |
|---|---|---|
| CN | 1984809 A | 6/2007 |
| CN | 101108580 B | 1/2008 |

(Continued)

OTHER PUBLICATIONS

European Patent Office; International Search Report; Aug. 28, 2020.

(Continued)

*Primary Examiner* — Kevin Hurley
*Assistant Examiner* — Marlon A Arce
(74) *Attorney, Agent, or Firm* — Price Heneveld LLP

(57) ABSTRACT

A kingpin arrangement for an automatic coupling system including a kingpin extending in a kingpin direction, a turntable mounted rotatably about the kingpin direction relative to the kingpin and mounted on a plain-bearing, the turntable having an opening, through which the kingpin extends, and a support structure extending in a radial direction, the support structure including a fastener for indirectly and/or directly fastening and/or for mounting a plug connector, the support structure being fixed indirectly and/or directly to an end of the turntable.

22 Claims, 2 Drawing Sheets

(56) References Cited

U.S. PATENT DOCUMENTS

| | | | |
|---|---|---|---|
| 2005/0253361 A1 | 11/2005 | Bouwkamp | |
| 2011/0221165 A1* | 9/2011 | Alguera | ................. B60D 1/363 |
| | | | 280/477 |
| 2023/0174174 A1* | 6/2023 | Kübler | ............... B62D 53/0842 |
| | | | 280/433 |

FOREIGN PATENT DOCUMENTS

| | | |
|---|---|---|
| CN | 101878149 B | 11/2010 |
| CN | 1015650 B | 10/2012 |
| DE | 29821604 U | 2/1999 |
| DE | 102006003899 A1 | 1/2008 |
| DE | 202018104542 U1 | 10/2018 |
| DE | 102018101169 B3 | 5/2019 |
| DE | 102018106676 B3 | 7/2019 |
| EP | 0816211 A2 | 12/1998 |
| EP | 1900620 A1 | 3/2008 |
| EP | 2112008 A1 | 10/2009 |
| GB | 2068865 A | 8/1981 |
| WO | 2008009660 A1 | 1/2008 |

OTHER PUBLICATIONS

G. Niemann; Machine Elements; Book; Jan. 1, 1981; excerpt; second edition; Springer-Verlag Berlin Heidelberg GmbH; Germany.
https://youtu.be/a-8QjZ_ihzA; Title: Briefly Explained: Plain Bearings in Detail; Cited passages: Advantages of plain bearings: high load capacity, easy assembly, small installation space 1:12-1:40; Released: Apr. 29, 2015.

* cited by examiner

KINGPIN ARRANGEMENT

BACKGROUND OF THE INVENTION

The invention relates to a kingpin arrangement, in particular for an automatic coupling system.

Kingpin arrangements are known from the prior art and are used to be arranged on a trailer. The kingpin arrangements usually comprise a kingpin, which is used to be inserted into a fifth-wheel coupling arrangement and to be positively coupled there. This coupling allows a tractive force to be transmitted from the fifth-wheel arrangement to the kingpin arrangement. The kingpin arrangements known from the prior art are increasingly designed in such a way that they are used in an automatic coupling system. In such an automatic coupling system, a plug is usually rotatably mounted about the kingpin, wherein this plug is automatically connected to a complementary plug on the towing vehicle—during coupling. However, a problem with these arrangements known from the prior art is that these systems have a particularly high installation space requirement.

It is therefore the object of the present invention to provide a kingpin arrangement which is compact and requires only a small amount of installation space.

SUMMARY OF THE INVENTION

According to the invention, a kingpin arrangement, in particular for an automatic coupling system, comprises a kingpin, a turntable and a support structure, wherein the kingpin extends in a kingpin direction, wherein the turntable is mounted rotatably about the kingpin direction relative to the kingpin, in particular is mounted on a plain-bearing, wherein the turntable has an opening, through which the kingpin extends, wherein the support structure extends in a radial direction, wherein the support structure comprises fastening means for indirectly and/or directly fastening and/or for supporting a plug connector, wherein the support structure is fixed indirectly and/or directly to the turntable, in particular with a first end of the support structure. The kingpin arrangement according to the invention is intended to be mounted on a trailer, in particular on a semitrailer. Such a trailer is fundamentally intended to be towed by means of a towing vehicle. This towing is done in particular by the kingpin of the kingpin arrangement being insertable into a fifth wheel arrangement of a towing vehicle and being engageable there, so that forces can be transmitted from the towing vehicle to the trailer via the kingpin. In other words, this may mean that the kingpin of the kingpin arrangement serves to transmit towing and/or pushing forces between a trailer and a towing vehicle. In particular, the kingpin arrangement serves to be used in an automatic coupling system. An automatic coupling system in the sense of the invention is in particular a coupling system which serves and/or is designed to transmit power, pneumatic and/or electric energy or other energies or information signals between a towing vehicle and a trailer by an automatic connection of energy or information lines. The kingpin of the kingpin arrangement according to the invention extends along a kingpin direction. In other words, this may mean that the kingpin direction is the direction in which the length of the kingpin is determined. In particular, the kingpin is at least regionally rotationally symmetrical about the kingpin direction. The turntable of the kingpin arrangement is rotatably mounted about the kingpin direction, in particular by the use of plain bearings. The use of plain bearings for the mounting of the turntable has the advantage that a particularly space-saving mounting is achieved. Due to the rotatable mounting of the turntable relative to the kingpin, the support structure can be pivoted about the kingpin direction, so that the turntable is in particular able to be pivoted, for example, when cornering. The turntable has an opening through which the kingpin extends and/or can extend. In other words, this may mean that the kingpin is at least partially guided through the turntable. In addition to the kingpin and the turntable, the kingpin arrangement comprises a support structure. This support structure extends in a radial direction. The radial direction is in particular such that it is perpendicular to the kingpin direction. The direction of extension of the support structure is in particular the direction in which the support structure extends. Alternatively or additionally preferred, the direction of extension of the support structure can also be the direction in which the length of the support structure is determined. Advantageously, the support structure has fastening means for indirectly and/or directly fastening and/or mounting a plug connector. The plug connector serves in particular to be connected and/or connectable to a complementarily designed plug on a towing vehicle. In other words, this may mean that an automatic coupling system is formed or realised by the plug connector in conjunction with the complementary plug on the towing vehicle. For example, the plug connector may have pneumatic, hydraulic and/or electric plug contacts to establish an energy-conducting connection with a towing vehicle. The fastening and/or the mounting of the connector to the support structure is effected via the fastening means of the support structure, wherein these may be formed, for example, as bores and/or projections and/or as fixing surfaces. By fastening and/or mounting in this context it can be understood that the support structure serves to support or carry the connector. The support structure itself is fixed indirectly and/or directly to the turntable, in particular with a first end of the support structure. The first end of the support structure forms in particular a distal end region of the support structure, wherein the first end is in particular the distal end region of the support structure which faces the kingpin. Advantageously, the first end has mounting openings for a fixing. This fixing to the turntable can in particular be effected by a reversible fixing by means of screws. Alternatively or additionally preferably, the support structure can also be fixed to the turntable by material-locking, form-fitting and/or force-fitting joining. By fixed in this context it can be understood that one end of the support structure can be arranged stationary in relation to the turntable. In other words, this may mean that the turntable and the support structure may be fixed relative to each other. By arranging the support structure indirectly and/or directly on the turntable, a particularly compact kingpin arrangement results—despite the support structure—which only requires a small amount of installation space.

Advantageously, the support structure projects beyond the turntable in the radial direction. Projecting beyond the turntable is to be understood in such a way that the support structure is further away from the kingpin in the radial direction than any part of the turntable. In particular, the support structure is designed to project radially further—compared to the turntable—in such a way that the maximum distance of the support structure from the kingpin or from the kingpin direction of the kingpin is twice as far as the maximum distance of the turntable from the kingpin direction. By projecting the support structure in the radial direction beyond the turntable, better accessibility of the fastening means of the support structure can be achieved. This can therefore in particular improve or simplify the fixing and accessibility of the plug connector.

Advantageously, the minimum distance between the kingpin and the support structure, in particular between the kingpin and the first end of the support structure, is a maximum of 35 mm, preferably a maximum of 10 mm and more preferably a maximum of 5 mm. The minimum distance is the theoretically smallest distance between the kingpin and the support structure. At a minimum distance between the kingpin and the support structure of maximum 35 mm, a particularly compact kingpin arrangement can be achieved which can be easily mounted. With a minimum distance of maximum 10 mm, the applicant has surprisingly found that such an arrangement results in particularly advantageous vibration damping properties. With a minimum distance between the kingpin and the support structure of maximum 5 mm, a particularly safe kingpin arrangement can be achieved, since an engagement or a squeezing into the gap between the kingpin and the support structure—with such a small distance—is particularly difficult. Therefore, such a minimum distance of maximum 5 mm increases the operational safety of the kingpin arrangement.

Expediently, the ratio of the minimum distance between the kingpin and the support structure, in particular the connection point of the support structure, to the maximum diameter of the turntable is in a range from 0.002 to 0.3, preferably in a range from 0.005 to 0.2 and more preferably in a range from 0.01 to 0.13. The maximum diameter of the turntable is in particular the diameter of the maximum outer dimension of the turntable. With a ratio of the minimum distance between the kingpin and the support structure to the maximum diameter of the turntable in the range from 0.002 to 0.3, a particularly secure fixing can be achieved, because with this design a sufficiently large supporting surface is available for the support structure, so that a particularly low-tilt support can be guaranteed. With a ratio in the range from 0.005 to 0.2, the applicant has surprisingly found that the support structure has a particularly low vibration behaviour in operation. A ratio in the range from 0.01 to 0.13 results in a particularly space-saving kingpin arrangement. The connection point of the support structure is in particular the point with which the support structure is supported, for example in relation to the turntable.

Advantageously, the support structure, in particular the connection point of the support structure, is arranged and or fixed in such a way that it is non-displaceable and/or stationary relative to or with respect to the turntable. In this way, a particularly mechanically resilient kingpin arrangement can be achieved.

Preferably, the kingpin is at least partially arranged between components of the support structure. In this way, a particularly compact design of the kingpin arrangement can be achieved. By "between" it can be understood that at least parts of the support structure extend on both sides of the kingpin. In other words, the kingpin can therefore be at least partially or at least sectionally surrounded by the support structure or extend between components of the support structure.

Expediently, the support structure has two legs, wherein each of the legs is indirectly and/or directly fixed to the turntable, wherein advantageously the kingpin is at least partially arranged between the legs. The provision of two legs or the at least partial formation of the support structure via two different legs results in a particularly light support structure which, however, still has a particularly high degree of flexural strength. This allows both material and weight to be saved, resulting in a particularly light yet resilient support structure. In particular, the two legs of the support structure are designed in such a way that they limit the support structure perpendicular to the direction in which the support structure extends. In other words, this may mean that the lateral boundaries of the support structure are formed by the legs. This results in a particularly flexurally rigid support structure. By forming the kingpin arrangement in such a way that the kingpin is at least partially arranged between the legs, a particularly compact and space-saving kingpin arrangement results, because this makes optimum use of the available installation space. In order to further improve this utilisation of installation space, in particular those surfaces of the support structure which are formed closest to the kingpin are formed complementary to the kingpin. Complementary can mean, for example, in the case of a rotationally symmetrical kingpin about the kingpin direction, that these surfaces of the support structure are in particular round and the centre of this rounding lies in particular on the kingpin direction. In other words, this can mean that the surfaces closest to the kingpin have the same centre of curvature as the closest and outwardly bounding surfaces of the kingpin. This allows the support structure to be arranged particularly close to the kingpin, resulting in a particularly compact kingpin arrangement.

Advantageously, in a support structure with two legs, each of the two legs form part of the first end of the support structure and are fixedly connected to the turntable at this respective first end. In other words, this may mean that each leg can form its own part of the first end of the support structure, with each of these parts in turn being fixed to the turntable. This results in a particularly mechanically secure support of the support structure.

Advantageously, the support structure is mirror-symmetrical, in particular with respect to a symmetry plane which is spanned by the kingpin direction and by the radial direction. By forming the support structure as a mirror-symmetrical structure, it can be manufactured particularly easily. In addition, this type of design also has advantages with regard to weight distribution.

Preferably, the support structure is formed at least in sections v-shaped, in particular pointing towards the kingpin. A v-shaped design in sections means that the outer contour of the support structure is at least partially oblique to the radial direction and/or the direction in which the support structure extends. This makes it possible, in particular, to facilitate the alignment of the support structure when driving into a fifth wheel coupling arrangement on a towing vehicle. It is particularly preferred if this at least partially V-shaped section of the support structure is formed in such a way that the V-shape points in an arrow-like manner towards the kingpin direction or towards the kingpin.

Expediently, the turntable has an outer diameter of at most 400 mm, preferably at most 300 mm and particularly preferably at most 250 mm. The outer diameter of the turntable is in particular the maximum possible outer diameter of the turntable. Advantageously, the centre of the turntable lies on the kingpin direction. With an outer diameter of the turntable of at most 400 mm, a particularly good compromise is achieved between mechanical load capacity and installation space requirements of the turntable and/or the entire kingpin arrangement. To enable a particularly simple and cost-effective production of the turntable, the maximum outer diameter of the turntable should be at most 300 mm. To achieve a particularly compact kingpin arrangement, the turntable should have a maximum outer diameter of 250 mm. For example, such a small outer diameter of the turntable can be achieved by the turntable being mounted on plain bearings. Alternatively or additionally preferably, such a compact arrangement can also be achieved by the turntable being formed, for example, of brass and/or bronze and/or of another material capable of plain bearings. This is because this type of construction allows the kingpin arrangement to dispense with roller bearing arrangements that require a lot of installation space. In this context, however, it should be noted that although a plain bearing turntable can be designed to be small, it does not necessarily have to be designed to be small. In other words, this means that turntables on plain bearings can also have maximum outer diameters of more than 300 mm.

Advantageously, the turntable is at least partially made of brass and/or bronze. This makes it particularly easy to rotate the turntable, because brass and/or bronze have particularly good tribological properties, especially with regard to the coefficient of friction that occurs and/or with regard to wear resistance. By using brass and/or bronze as the turntable material, it is possible in particular to dispense with the use of roller bearings. Advantageously, at least the part of the turntable that comes into contact with further components for bearing is made of brass and/or bronze. In this way, the good tribological properties of brass and/or bronze can be ideally utilised. Alternatively preferably, the entire turntable can be made of brass and/or bronze. This results in a turntable that is particularly easy to manufacture.

The turntable expediently has at least one aperture, wherein the aperture is designed for cables and/or lines to be guided through it. In particular, the aperture is designed in such a way that it allows a cable and/or conduit to pass through from an upper side to a lower side of the turntable. In other words, this can mean that the aperture completely penetrates the turntable, in particular in the kingpin direction. Due to the possibility of passing cables directly through the turntable, particularly short cable and/or line lengths can be achieved, so that costs can be saved.

In an advantageous embodiment, the aperture opens between parts of the support structure, in particular between the two legs of the support structure. By providing the opening of the aperture between parts of the support structure, in particular between the legs, the cables guided through the aperture are mechanically protected against external loads. In other words, this may mean that by providing the opening between parts of the support structure, in particular between the two legs, if the support structure is twisted, the leg(s) or the support structure will first make contact with a part "in the way" before the cables and/or the conduits can be damaged by this "part in the way". Therefore, a particularly operationally safe kingpin arrangement is achieved by the breakthrough opening between parts of the support structure, in particular between the two legs.

The kingpin arrangement expediently comprises a dome, wherein the kingpin is indirectly and/or directly attached to the dome, and wherein advantageously the dome has a mounting face adapted to secure the dome to a trailer. In particular, the dome is used to fix the kingpin directly and/or indirectly to the dome, in particular by means of a material and/or force fit and/or a form fit. In addition, the dome is able to transfer a load from the kingpin to a trailer via the mounting face of the dome. Advantageously, the mounting face of the dome has a normal which is parallel to the kingpin direction. In this way, a particularly simple and safe as well as compact kingpin arrangement can be achieved, which achieves a particularly safe support of the kingpin. Advantageously, the dome is formed in one piece. This may increase the mechanical load capacity of the dome.

Advantageously, the dome is designed in such a way that it supports the turntable directly and/or indirectly in relation to the trailer. For this purpose, the dome has in particular a support surface that makes direct and/or indirect contact with the turntable and/or serves to support the turntable.

Advantageously, the kingpin arrangement comprises an end plate, wherein the end plate is arranged indirectly and/or directly at the dome, wherein the turntable is arranged at least in sections between the end plate and the dome, in particular at least one bearing section of the turntable lying on the outside in the radial direction is arranged between the dome and the end plate, so that displaceability of the turntable in the kingpin direction and in the radial direction is positively prevented by the dome and/or by the end plate. This direct positive limitation of the displaceability of the turntable achieves a particularly compact arrangement. Advantageously, the turntable is arranged in such a way that the bearing section is arranged between the dome and the end plate in a direction parallel to the kingpin direction. In particular, the end plate has an inner opening which is rotationally symmetrical to the kingpin direction and wherein the turntable and/or the kingpin extend at least partially through this inner opening of the end plate. In this way, a particularly compact kingpin arrangement or turntable bearing can be achieved.

In an advantageous embodiment, the turntable is mounted on a plain-bearing with respect to the end plate and/or the turntable is mounted on a plain-bearing with respect to the dome. Due to the plain bearing of the turntable relative to the end plate and/or relative to the dome, a particularly space-saving kingpin arrangement can be achieved, because space-consuming roller bearing arrangements can be saved. These roller bearing arrangements are particularly space-intensive not only in the radial direction, but also in the direction of the kingpin direction, so that dispensing with these roller bearing arrangements results in a very compact kingpin arrangement.

Advantageously, a slide ring is arranged between the dome and the turntable and/or a slide ring is arranged between the turntable and the end plate. By using a slide ring, a particularly low-wear and low-friction plain bearing is achieved. Furthermore, this type of plain bearing also has the advantage that the maintenance effort or the maintenance costs of such a plain bearing are very low due to the replacement of the low-cost slide ring, because in particular expensive parts such as the turntable and/or the end plate do not have to be completely replaced, but the replacement of a worn slide ring is completely sufficient.

Expediently, at least one slide ring and/or the slide rings are at least partially, preferably completely, made of a plastic, in particular a thermoplastic plastic. The use of plastic in the slide rings and/or the slide ring and/or the complete formation of the slide ring and/or the slide rings from plastic results in particularly cost-effective slide rings. A thermoplastic slide ring has particularly good tribological properties, in particular with regard to the combination of wear and coefficient of friction.

Advantageously, a wrap angle of the support structure, measured from the kingpin direction and in a plane whose normal is parallel to the kingpin direction, lies in a range of 70° to 190°, preferably in a range of 90° to 150° and particularly preferably in a range of 110 to 140°. The wrap angle is in particular the angle which, seen from the kingpin direction, encloses the support structure. For example, this wrap angle is the opening angle of the V whose leg intersection point lies on the kingpin direction and whose legs just completely surround the support structure. With a wrap angle in the range of 70 to 90°, a particularly secure fastening of the support structure to the turntable can be achieved, as in this case a flat connection possibility between turntable and support structure can be created. A wrap angle in the range of 110° to 140°, on the other hand, results in a particularly space-saving kingpin arrangement.

BRIEF DESCRIPTION OF THE DRAWINGS

Further advantages and features of the present invention result from the following description with reference to the figures. Individual features of the embodiment shown can also be used in other embodiments, unless this has been expressly excluded. It is shown in.

DETAILED DESCRIPTION OF THE PREFERRED EMBODIMENTS

Figure 1:
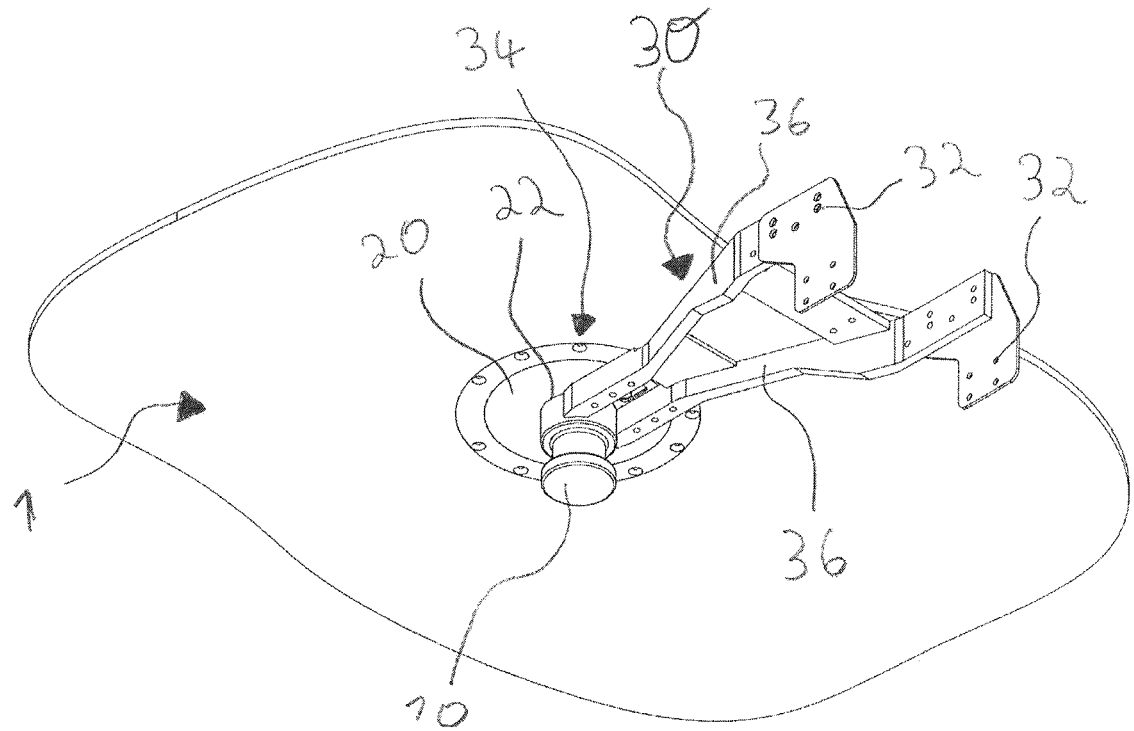
FIG. 1 is a bottom perspective view of a kingpin arrangement.

FIG. 1 shows a kingpin arrangement 1. This kingpin arrangement 1 has a kingpin 10, a turntable 20 and a support structure 30. The kingpin 10 extends through an opening 22. The support structure 30 is reversibly fixed to the turntable 20 with a first end 34. At the other distal end of the support structure 30, the latter has fastening means 32 in the form of holes, by means of which fastening means a plug connector for an automatic coupling system can be fixed to the support structure 30. A V-shaped area extends between the first end 34 and the other distal end of the support structure 30. The support structure 30 is designed in such a way that it has two legs 36 which are connected to each other via intermediate elements.

Figure 2:
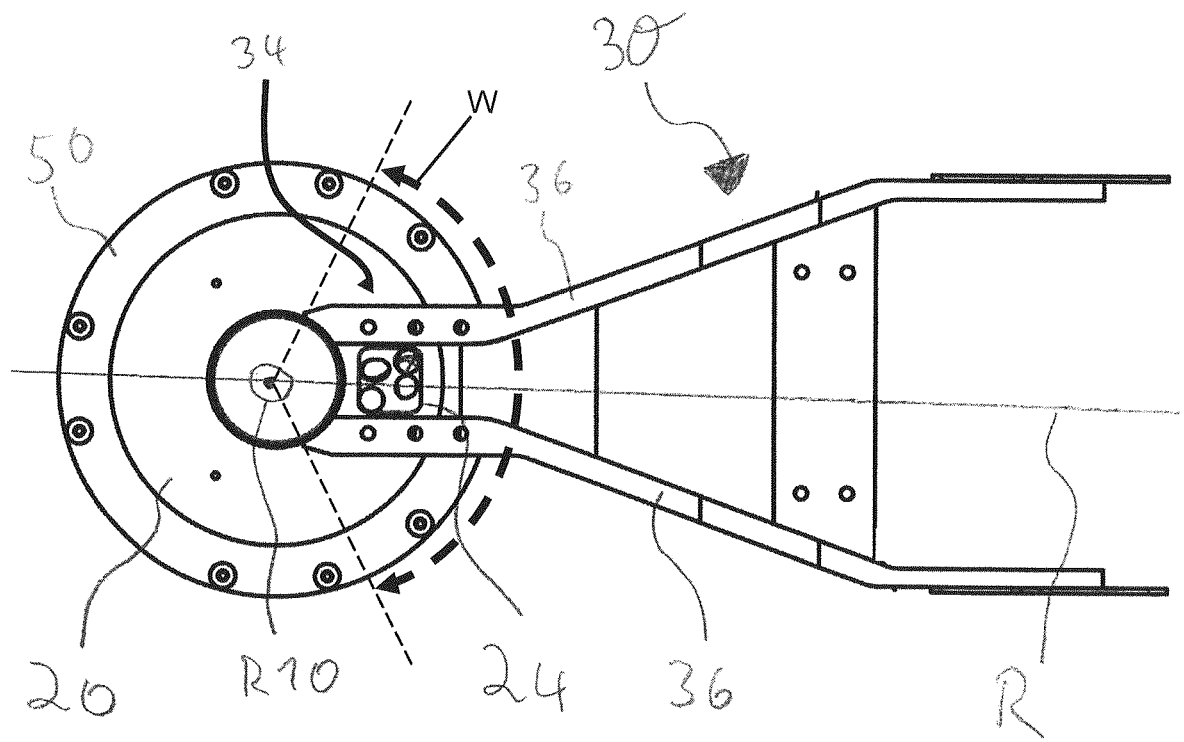
FIG. 2 is a top plan view of a kingpin arrangement in kingpin direction.

FIG. 2 shows a view of a kingpin arrangement in the direction of the kingpin direction R10. This kingpin direction R10 is the direction in which the kingpin 10 extends and also, in particular, the direction about which the kingpin 10 is at least partially rotationally symmetrical. In addition to the kingpin, the kingpin arrangement according to the invention also has a turntable 20 and a support structure 30. The support structure 30 extends in the radial direction R and also has two laterally bordering legs 36, which are V-shaped at least in some areas. In FIG. 2 it can be seen that the V-shaped section is designed to face the kingpin 10. As can be seen from FIG. 2, the kingpin 10 is at least partially arranged between components of the support structure 30, because at least parts of the support structure 30 extend on both sides to the kingpin 10. In the embodiment shown in FIG. 2, the support structure 30 is formed in such a way that each leg 36 forms a first end 34 which is fixed to the turntable 22. The turntable 20 has an aperture 24 which opens between the two legs 36. Cables are guided within or through this aperture 24. The turntable 20 is positively secured against displacement in the direction of the kingpin by the end plate 50. In the embodiment shown in FIG. 2, the wrap angle W surrounding the support structure 30 is also visible.

Figure 3:
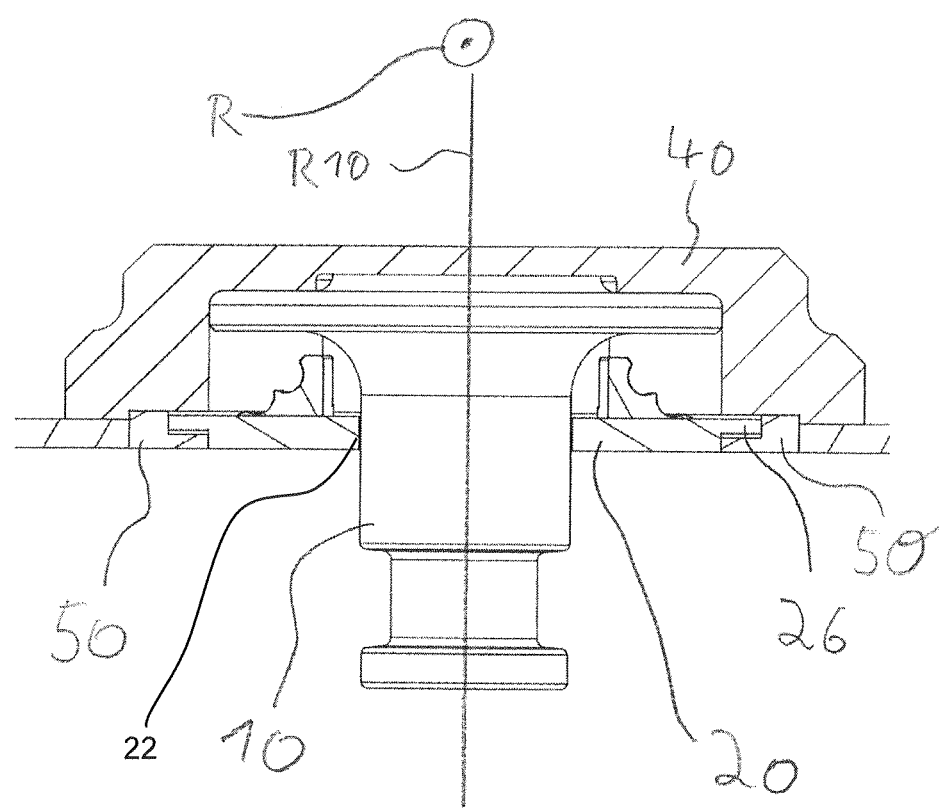
FIG. 3 is a sectional side elevational view through a kingpin arrangement.

FIG. 3 shows a sectional view through a part of a kingpin arrangement. The sectional plane is designed in such a way that it has a normal parallel to the radial direction R. In the embodiment shown in FIG. 3, the kingpin arrangement has a dome 40, with the bearing section 26 of the turntable 20 being located between the dome 40 and the end plate 50. As can be seen in FIG. 3, the turntable 20 has an opening 22 through which the kingpin 10 extending in the kingpin direction R10 extends. The dome 40 serves to support the kingpin 10 as well as the turntable 20 and the end plate 50 with respect to a trailer or a base plate of a trailer.

LIST OF REFERENCE SIGNS

1—kingpin arrangement
10—kingpin
20—turntable
22—opening
24—aperture
26—bearing section of the turntable
30—support structure
32—fastening means
34—first end
36—leg
40—Dome
50—end plate
R—radial direction
R10—kingpin direction
W—wrap angle

The invention claimed is:

1. A kingpin arrangement for an automatic coupling system, comprising:
   a kingpin;
   a turntable; and
   a support structure;
   wherein the kingpin extends in a kingpin direction;
   wherein the turntable is mounted rotatably about the kingpin direction relative to the kingpin on a plain-bearing;
   wherein the turntable has an opening through which the kingpin extends;
   wherein the support structure extends in a radial direction;
   wherein the support structure comprises a fastener configured to indirectly and/or directly fastening and/or mounting a plug connector; and
   wherein a first end of the support structure is fixed indirectly and/or directly to the turntable;
   wherein the support structure includes two legs;
   wherein each of the legs is indirectly and/or directly fixed to the turntable; and
   wherein the kingpin is at least partially arranged between the two legs when viewed in a vertical direction.

2. The kingpin arrangement according to claim 1, wherein the support structure projects beyond the turntable in the radial direction.

3. The kingpin arrangement according to claim 1, wherein a ratio of a distance between the kingpin and the support structure to a maximum diameter of the turntable is in a range from about 0.002 to about 0.3.

4. The kingpin arrangement of claim 3, wherein the range is from 0.005 to 0.2.

5. The kingpin arrangement of claim 4, wherein the range is from 0.01 to 0.13.

6. The kingpin arrangement according to claim 1, wherein the support structure comprises a V-shape pointing towards the kingpin.

7. The kingpin arrangement according to claim 1, wherein the turntable has an outer diameter of less than or equal to 400 mm.

8. The kingpin arrangement of claim 7, wherein the outer diameter is less than or equal to 300 mm.

9. The kingpin arrangement of claim 8, wherein the outer diameter is less than or equal to 250 mm.

10. The kingpin arrangement according to claim 1, wherein the turntable at least partially comprises brass and/or bronze.

11. The kingpin arrangement according to claim 1, wherein the turntable has at least one aperture configured to receive cables and/or lines therethrough.

12. The kingpin arrangement according to claim 1, further comprising:
a dome, wherein the kingpin is indirectly and/or directly attached to the dome, and wherein the dome has a mounting face configured to secure the dome to a trailer.

13. The kingpin arrangement according to claim 12, further comprising:
an end plate, arranged indirectly and/or directly at the dome, and wherein the turntable is arranged at least in sections between the end plate and the dome, and wherein at least one bearing section of the turntable lying on the outside in the radial direction is arranged between the dome and the end plate, such that a displaceability of the turntable in the kingpin direction and in the radial direction is positively prevented by the dome and/or by the end plate.

14. The kingpin arrangement according to claim 13, wherein the turntable is mounted on a plain-bearing with respect to the end plate and/or wherein the turntable is mounted on a plain-bearing with respect to the dome.

15. The kingpin arrangement according to claim 13, wherein a slide ring is arranged between the dome and the turntable and/or between the turntable and the end plate.

16. The kingpin arrangement according to claim 1, wherein a wrap angle of the support structure measured from the kingpin direction and in a plane having a normal that is parallel to the kingpin direction is within a range of 70° to 190°.

17. The kingpin arrangement of claim 16, wherein the range is 90° to 150°.

18. The kingpin arrangement of claim 17, wherein the range is 110° to 140°.

19. A kingpin arrangement for an automatic coupling system, comprising:
a kingpin;
a turntable; and
a support structure;
wherein the kingpin extends in a kingpin direction;
wherein the turntable is mounted rotatably about the kingpin direction relative to the kingpin on a plain-bearing;
wherein the turntable has an opening through which the kingpin extends;
wherein the support structure extends in a radial direction;
wherein the support structure comprises a fastener configured to indirectly and/or directly fastening and/or mounting a plug connector; and
wherein a first end of the support structure is fixed indirectly and/or directly to the turntable;
wherein the support structure includes two legs;
wherein each of the legs is indirectly and/or directly fixed to the turntable;
wherein the kingpin is at least partially arranged between the two legs; and
wherein a distance between the kingpin and the first end of the support structure is a maximum of about 35 mm.

20. The kingpin arrangement of claim 19, wherein the maximum of the distance is 10 mm.

21. The kingpin arrangement of claim 20, wherein the maximum of the distance is 5 mm.

22. A kingpin arrangement for an automatic coupling system, comprising:
a kingpin;
a turntable; and
a support structure;
wherein the kingpin extends in a kingpin direction;
wherein the turntable is mounted rotatably about the kingpin direction relative to the kingpin on a plain-bearing;
wherein the turntable has an opening through which the kingpin extends;
wherein the support structure extends in a radial direction;
wherein the support structure comprises a fastener configured to indirectly and/or directly fastening and/or mounting a plug connector; and
wherein a first end of the support structure is fixed indirectly and/or directly to the turntable;
wherein the support structure includes two legs;
wherein each of the legs is indirectly and/or directly fixed to the turntable;
wherein the kingpin is at least partially arranged between the two legs; and
wherein an aperture opens between the two legs.

* * * * *